Figure 1:
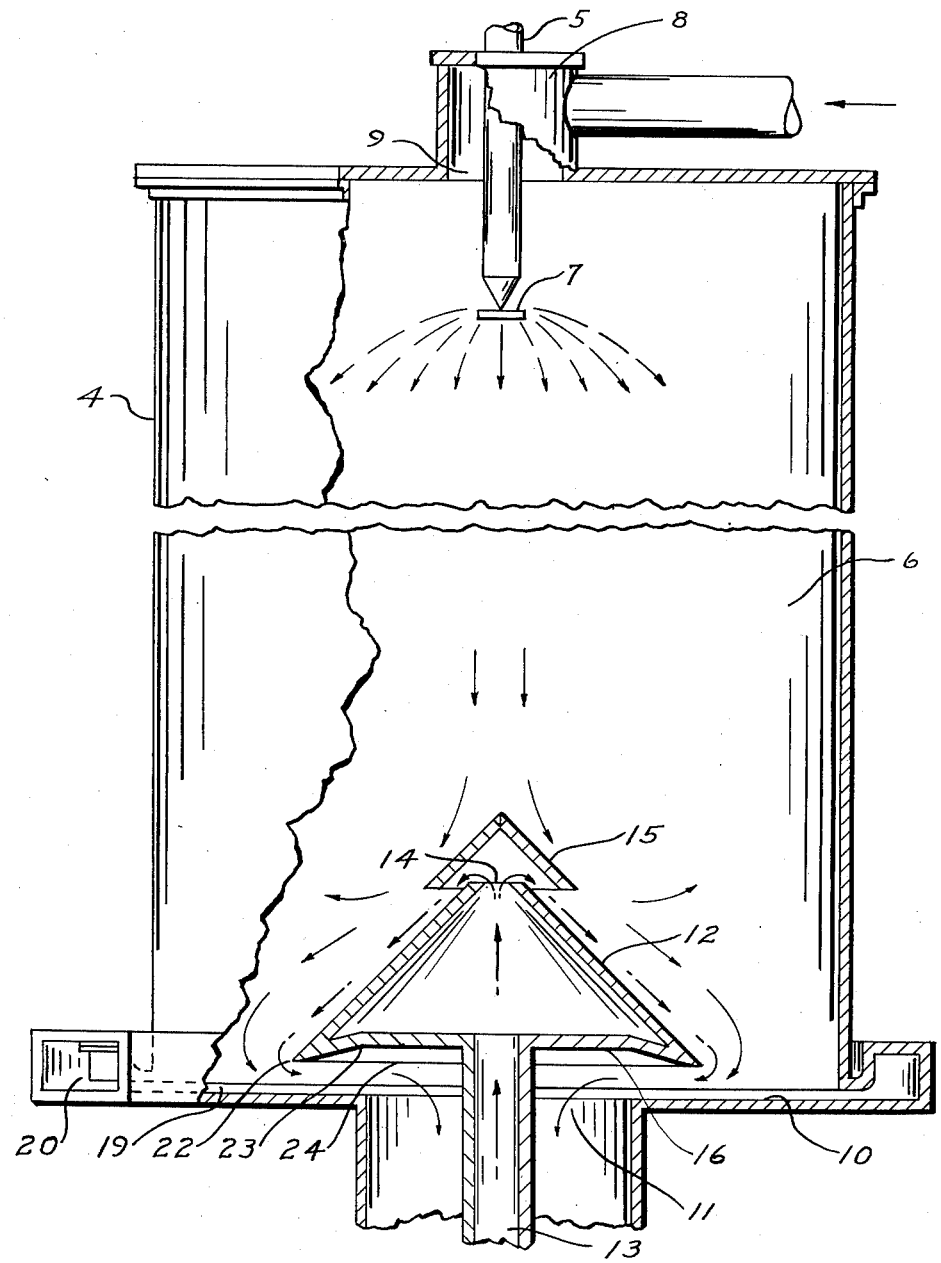

Nov. 20, 1951   R. E. COLWELL   2,575,748
DESICCATION PRODUCT REMOVAL MEANS

Filed March 23, 1950   2 SHEETS—SHEET 2

INVENTOR.
ROBERT E. COLWELL
BY
ATTORNEY

Patented Nov. 20, 1951

2,575,748

UNITED STATES PATENT OFFICE 2,575,748

DESICCATION PRODUCT REMOVAL MEANS

Robert E. Colwell, Springfield, Mass., assignor to Monsanto Chemical Company, St. Louis, Mo., a corporation of Delaware Application March 23, 1950, Serial No. 151,384

5 Claims. (Cl. 159—4)

This invention relates to spray drying processes and apparatus therefor. More particularly, the invention relates to an improved method and means for controlling the flow of the gaseous drying medium having dried solid material suspended therein.

Spray dryers are used as rapid and efficient means for removing volatile materials from various types of solids. Briefly, they operate as follows: (1) the solid material dissolved or suspended in a volatile material is introduced into a tower in the form of a spray; (2) a hot gaseous medium is introduced into the tower and is directed so that it mixes quickly and thoroughly with the spray; (3) the volatile material evaporates and becomes greatly diluted by the gaseous medium precipitating the solid material in the form of a dry powder; (4) the gaseous medium is continuously removed from the drying chamber carrying with it the major portion of the dry powder; (5) a portion of the dry powder collects on the bottom of the tower and must be removed therefrom.

Many of the problems concerned with the introduction of the material to be dried and the drying medium have been solved, but the removal of the gaseous mixture and the dried powder from the spray drying chamber still presents difficulties. For example, the gaseous drying medium tends to channel, i. e., to travel directly to and through the exit port thereby minimizing the amount of drying action. In addition, a substantial amount of dried material collects on the bottom of the dryer and must be removed therefrom before it re-absorbs the solvent or suspending agent and becomes tacky. Still another difficulty particularly pertinent to resinous materials is the problem of cooling the dried material before it enters the collecting devices so that it will not agglomerate to form large lumps or adhere to the surfaces of the apparatus.

Various devices have been suggested for solving the problems presented by the removal of the gaseous medium and the dried powders. These devices have ranged from the use of jets to introduce the drying medium with a swirling motion and with sufficient force to project the drying medium against the walls, to the use of mechanical and air sweeps to change the direction of flow of the drying medium through the lower part of the chamber and to remove dried material from the bottom of the tower.

Many of the remedies suggested have resulted in a partial solution of the problems but at the same time have created new problems. For example, the mechanic sweep is fairly efficient for removing dried powder from the floor of the chamber and reduces the channeling of the drying medium to some extent. However, the various parts of the sweeps have served as additional surfaces on which the dried powder accumulated necessitating frequent shutdowns for cleaning operations.

An object of this invention is to provide an improved spray drying apparatus.

A further object is to provide a means for preventing channeling of the gaseous drying medium.

Another object is to provide a means for cooling the dried material and the drying medium near the bottom of the chamber.

Still another object is to provide a means for expediting the removal of the dried material from the drying chamber.

Figure 2:
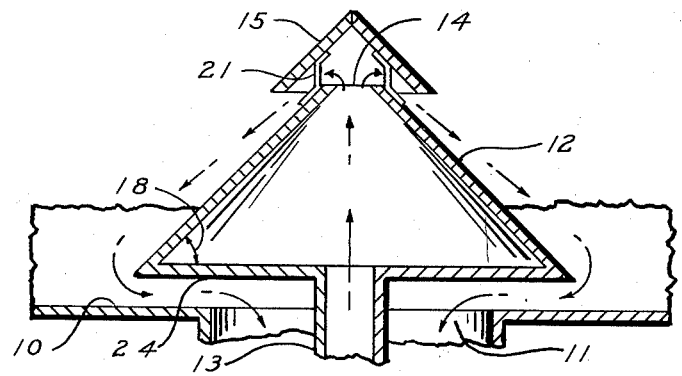
Figure 3:
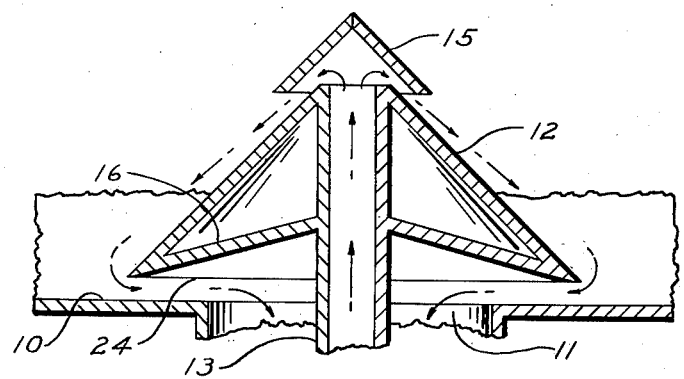
Figure 4:
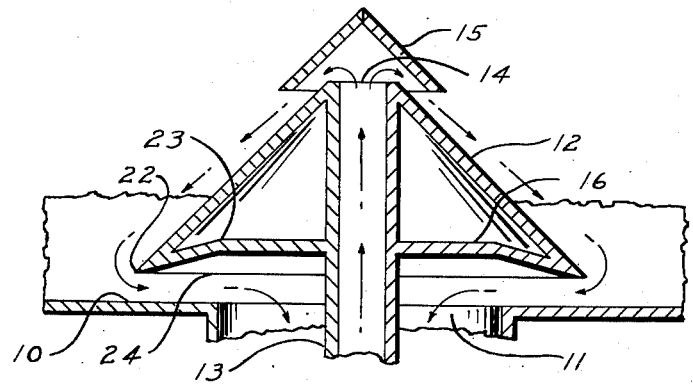

Other objects will be evident from an inspection of the accompanying drawings in which:

Figure 1 is a diagrammatic view, partly in section, of a spray drying tower; and Figures 2, 3 and 4 are diagrammatic sectional views of three embodiments of the invention.

These and other objects are attained by inserting a truncated conical baffle into the chamber of the dryer concentrically over the exit port thereof and by providing a means for delivering a relatively cool gaseous medium into the drying chamber through the top of the cone.

Referring to the figures, spray tower 4 is provided at the top with a conduit 5 leading into the drying chamber 6 and carrying atomizing means 7. Also, at the top of the tower and surrounding conduit 5, there is provided conduit 8 leading to port 9. Floor 10 is provided with an exit port 11.

A truncated conical baffle 12, having base 16, is located concentrically over exit port 11 and above floor 10. A conduit 13 leads from outside of the spray chamber into the base of conical baffle 12. At the top of said baffle is a port 14. Situated directly over port 14 and spaced a short distance therefrom is a secondary baffle 15.

Figure 1 may be used to describe in detail the normal operation of the dryer. A solution of a solid in a volatile liquid or a fluid mixture of a solid with a volatile liquid such as an aqueous slurry is introduced through conduit 5 into chamber 6 where atomizer 7 converts the liquid to the form of a fine spray. A heated gas such as air, nitrogen, carbon dioxide, etc. is introduced into the chamber through conduit 8 and port 9. The temperature of the gas is sufficiently high to evaporate the volatile liquid in the spray, and the volume of the gas is sufficiently high to dilute the volatile liquid to such an extent that it will not be readily re-absorbed by the dried solid. The dilute mixture of volatilized liquid and gaseous heating medium retains a major proportion of the pulverulent dried solids and carries it down through the tower. As the gaseous stream flows down through the tower, the central portion of it impinges on the sides of the baffle 12 and is deflected towards the walls of the chamber as shown by the solid arrows. A current of a relatively cool gaseous medium is simultaneously fed through conduit 13, and out through port 14, against the under side of secondary baffle 15, whence it flows down the sides of baffle 12 as shown by the broken arrows. The suspension of solid particles in the gaseous medium eventually passes under the base 16 of baffle 12 and out through port 11 to a collecting device not shown.

In the spray drying operation, the flow of the gaseous media and of the dried particles suspended therein is controlled by maintaining a pressure differential between the inlet and exit ports of the drying tower, such that the lower pressure is always at the exit port. It is immaterial whether the pressure differential is the difference between two positive pressures, between a positive and a negative pressure, between atmospheric pressure and a negative pressure, or between two negative pressures. A standard method of providing a pressure differential is to insert an exhaust fan in the device for receiving the dried material. If the fan is of sufficient size and proper design, it may be used as the sole source of pressure differential. However, it is also feasible to provide a blower to force the desiccating gas into the drying chamber under positive pressure.

The essence of this invention is the use of the conical baffle and the passage of a relatively cool gaseous medium through and over the baffle.

The size and shape of the conical baffle 12 is critical in several respects. The base of the cone 24 must extend beyond the periphery of exit port 11 to prevent channeling of the gaseous media, and it must also be located far enough above the floor of the drying chamber to prevent excessive pressure drop between the chamber and the exit port. In general, the area of the base of the cone 24 should be from 50% to 200% greater than the area of the exit port. At smaller diameters, channeling of the gaseous media is not prevented and at larger diameters, substantial benefits are not obtained.

The shape of baffle 12 may be varied and is described above as "conical" in the sense set forth in Webster's New International Dictionary published by G. & C. Merriam Co., i. e., "a solid bounded by a circular or other closed plane base and the surface formed by line segments joining every point of the border of the base to a common point called the vertex." Thus, the baffle instead of having a round base and round sides may have polygonal base and sides corresponding thereto.

The height of the conical baffle 12 may be varied within certain limits. It should be at least equal to the radius of the base of the cone and may be increased to about 4 times said radius. In different language, the angle 18 between the base of the cone and the side thereof may be varied between 45° and 75°. If the angle is less than 45°, the slope of the sides is so gentle that dried material may collect thereon in spite of the flow of gaseous medium. If the angle is greater than 75°, the sides of the baffle are too steep to effectively deflect the desiccating medium and channeling occurs.

The baffle 12 may be solid except for the conduit 13 passing therethrough or it may be hollow with conduit 13 extending only to the base thereof as shown in Figures 1 and 2. In practice, it is preferable to use a hollow baffle since it permits the relatively cool gaseous medium entering from conduit 13 to maintain the walls of the baffle at a temperature low enough to prevent adhesion of the dried particles thereto.

Baffle 12 may be held in place by conduit 13 or it may be mounted on suitable brackets or standards, not shown.

The temperature of the relatively cool gaseous medium introduced through conduit 13 may be varied over a wide range with the restriction that it should be substantially cooler than the desiccating medium and preferably should be at a temperature below the softening point of the dried material. For economical reasons, the temperature of the relatively cool gas will be atmospheric temperature although it may be cooled substantially below that point or heated above it when necessary.

Figures 2, 3 and 4 are diagrammatic representations of specific embodiments of this invention.

In Figure 2, conical baffle 12 is hollow and has a base 24 which is parallel to the floor of the drying chamber. Conduit 13 terminates at the base 24. Located above baffle 12 is a smaller baffle 15 mounted on brackets 21. The small baffle serves to deflect the cool gaseous medium issuing from port 14 down the sides of baffle 12. Baffle 15 is preferably of the same shape as baffle 12 but it may be of any generally conical shape. The periphery of the base of baffle 15 extends beyond and above the periphery of port 14.

In Figure 3, the base 16 of baffle 12 slants away from the floor of the drying chamber from the periphery of the baffle to the periphery of conduit 13. The slanting base serves to eliminate possible excess pressure differentials which may sometimes interfere with the smooth flow of the chamber contents through port 11.

The preferred embodiment of this invention is shown in Figure 1, wherein the base of baffle 12 is slanted from the periphery 22 of the baffle to a point 23 opposite the periphery of port 11. The remainder of the base 16 of baffle 12 is parallel to the base of the drying chamber. In this modification, the slant of the base 16 from points 22 to 23 is critical. The slope of the baffle should be constructed according to the formula $RH=rh$ wherein R is a radius from the center of the base 16 of baffle 12 drawn to the periphery thereof, H is the height of base 16 above floor 10 at point 22, $r$ is any radius drawn from the center of the base to any point between 22 and 23 and $h$ is the height of the base above floor 10 at the outer extremity of $r$. By sloping the base 16 of baffle 12 according to this formula, linear flow of the gaseous medium with a gradual pressure drop is attained. As a result of this, all the particles suspended in the gaseous media are swept into exit port 11 and to the collecting device.

Figure 4 depicts a modification of the preferred embodiment of this invention, wherein conduit 13 passes completely through baffle 12 and terminates in port 14.

In a further embodiment of this invention, the floor of the drying chamber is separated from the walls thereof by circumferential opening or gap 19. Means such as a bustle pipe 20 surrounds said gap 19 and serves to introduce a relatively cool gaseous medium across the floor 10 of the chamber. The gaseous medium coming through gap 19 sweeps any dried material which has accumulated on the floor 10 of the dryer towards the periphery of baffle 12 where it is picked up by the gaseous medium flowing to the exit port and is carried under the baffle with the medium. By the addition of this secondary means for introducing a stream of relatively cool gaseous medium at the periphery of the floor of the drying chamber, no accumulation of dried material occurs even at the extreme outer edge of the dryer floor. This secondary means for introducing cool media at the bottom of the dryer is the subject of co-pending application Serial No. 50,355, filed September 21, 1948, and now matured into Patent Number 2,566,292, in the name of Frank E. Reese.

By using the apparatus described, it has been found possible to spray-dry a wide variety of materials having varied softening points, with the elimination of substantial accumulations of dried material at any point in the drying chamber. Furthermore, the dried material is delivered to the collecting devices in a relatively cool state so that no caking or lumping occurs in such collecting devices.

It is obvious that variations may be made in the processes and apparatus of this invention without departing from the spirit and scope thereof as defined in the appended claims.

What is claimed is:

1. In a spray drying chamber, means at the bottom of the chamber comprising a centrally located exit port for removing a gaseous medium containing solid particles suspended therein, a baffle in the shape of a truncated cone located concentrically over the exit port, the diameter of the base of said cone being substantially greater than the diameter of the exit port, the area of the base of said cone being from 50% to 200% greater than the area of the exit port and the height of said cone being from 1 to 4 times the radius of the base of the cone, means for introducing a gaseous medium into the spray drying chamber through the top of said cone, and means for deflecting said gaseous medium downward over the outer surface of said cone.

2. A spray drying apparatus as in claim 1 wherein the base of the truncated cone is flat and parallel to the floor of the drying chamber.

3. In a spray drying chamber, means adjacent the bottom of said chamber comprising a centrally located exit port for removing a gaseous medium containing solid particles suspended therein, a truncated cone located concentrically over said exit port, the diameter of the base of said cone being substantially greater than the diameter of the exit port, and the surface of the base of the cone receding from the floor of the dryer according to the relation $RH=rh$ wherein R is the radius of the base of the cone at the periphery thereof and H is the distance between the floor of the chamber and the periphery of the cone, $r$ is any other radius from the center of the base of the cone to any point on the base not on the periphery thereof and $h$ is the distance between the base of the cone and the floor of the chamber at the outer extremity of $r$, a conduit leading through the exit port into the base of said cone, an opening at the top of said cone, means for forcing a relatively cool gaseous medium through said conduit and said cone into the said chamber and a baffle located adjacent the top of said cone serving to deflect the gaseous medium downward over the outer surface of said cone.

4. A spray drying apparatus as in claim 3 in which the recession of the base of the truncated cone is terminated at points opposite the periphery of the exit port.

5. A spray drying apparatus as in claim 4 in which the conduit leading through the exit port into the base of the truncated cone continues through said cone and terminates at the opening at the top of said cone.

ROBERT E. COLWELL.

REFERENCES CITED

The following references are of record in the file of this patent:

UNITED STATES PATENTS

| Number | Name | Date |
| --- | --- | --- |
| 1,946,566 | Bowen | Feb. 13, 1934 |
| 2,449,366 | Bowen | Sept. 14, 1948 |